United States Patent [19]

Sekikawa

[11] Patent Number: 4,961,072
[45] Date of Patent: Oct. 2, 1990

[54] GRAPHICS DISPLAY METHOD FOR NUMERICAL CONTROL APPARATUS

[75] Inventor: Katsuhide Sekikawa, Aichi, Japan

[73] Assignee: Mitsubishi Denki Kabushiki Kaisha, Tokyo, Japan

[21] Appl. No.: 585,096

[22] Filed: Mar. 1, 1984

[30] Foreign Application Priority Data

Mar. 1, 1983 [JP] Japan ................................ 58-33452

[51] Int. Cl.$^5$ ............................................. G09G 1/00
[52] U.S. Cl. .................................. 340/731; 340/721; 364/521
[58] Field of Search ............... 340/723, 724, 731, 747, 340/721; 364/521

[56] References Cited

U.S. PATENT DOCUMENTS

| | | | |
|---|---|---|---|
| 4,197,590 | 4/1980 | Sukonick et al. | 340/747 |
| 4,295,198 | 10/1981 | Copeland et al. | |
| 4,366,475 | 12/1982 | Kishi et al. | 340/731 |
| 4,532,605 | 7/1985 | Waller | 340/731 |
| 4,533,910 | 8/1985 | Sukonick et al. | 340/721 |
| 4,546,349 | 10/1985 | Prohofsky et al. | 340/731 |

OTHER PUBLICATIONS

Tekscope Contents, vol. 13, No. 2, Jun., 1981, pp. 3–6, Tektronic Inc., Beaverton, OR., U.S.; "Two New Graphic Terminals Expand Graphic Capabilities".

Primary Examiner—Jeffery A. Brier
Attorney, Agent, or Firm—Sughrue, Mion, Zinn, MacPeak & Seas

[57] ABSTRACT

A method for displaying the configuration of a workpiece and the machining device of a numerical control machining apparatus in which it is possible to individually and simultaneously display enlarged images of selected portions. An input section of the numerical control apparatus is operated to input data indicative of the machining apparatus, the initial configuration of the workpiece, and the desired final configuration of the workpiece. This data is operated upon to obtain configuration data for display on the graphics display device. A selection number is then inputted for selecting the regions from the figure to be displayed. Viewing points representing centers of the various figures and images and scale factors for the plurality of regions to be displayed are then inputted. The images of the regions to be displayed are next scaled and clipped accordingly. The image data is then stored in the memory section for ultimate display on the graphics display device.

10 Claims, 5 Drawing Sheets

GRAPHICS DISPLAY METHOD FOR NUMERICAL CONTROL APPARATUS

BACKGROUND OF THE INVENTION

The invention relates to a method for displaying the configuration of a workpiece on a graphics display device in an NC (Numerical Control) apparatus used to control a machine for machining the workpiece.

In an NC machining apparatus, the position of a tool for machining a workpiece is instructed with corresponding numerical data derived from calculations. An NC machining apparatus can machine a workpiece in an intricate configuration with ease and with high accuracy, thus providing high productivity.

In general, an NC machining apparatus, as shown in FIG. 1, includes a numerical controller 20 for carrying out calculations based on numerical data commands inputted through a terminal 10, and a machining apparatus 30 controlled by the calculated data of the controller 20. The controller 10 includes an input section 21 to which commands are applied, an arithmetic section 22 for computing commands from the input section 21, a memory section 23 for storing the calculation results of the arithmetic section 22 and the commands from the input section, a control section 24 for controlling the arithmetic operation of the arithmetic section 22, an output section 25 for outputting arithmetic data such as calculation results provided by the arithmetic section 22, and a graphics display section 26 for displaying characters or configuration data inputted to the input section 21, calculation results produced by the arithmetic section 22, and the contents of the memory section 23.

In the machining apparatus 30, a tool 31 is held by a tool holder 32, which is secured to the chuck of a spindle 33. The spindle 33 is rotated by a spindle motor 34 which is controlled by a signal from the output section 25 of the controller 20. A workpiece 40 to be machined is fixed to a table 35 of the machining apparatus 30. In FIG. 1, reference numeral 36 designates a ball screw for moving the table 35 in the direction of the X axis. The ball screw 36 is driven through a gear box 37 by an X-axis feedmotor 38, which is in turn driven by a signal from the output section 25. Similar mechanisms (not shown) as that for moving the table 35 in the direction of the X axis with the ball screw 36 are provided for moving the table 35 in the direction of the Y axis and in the direction of the Z axis. These mechanisms are driven by signals outputted by the output section 25.

In a conventional display system for the configuration display device in such a numerical controller, designated parts of the configuration of a machining apparatus or a workpiece can be displayed. For instance, in the case where a part of a workpiece 40 to be machined with a lathe as shown in FIG. 2 is to be displayed enlarged, it is displayed as a single figure as shown in FIG. 3. In FIG. 3, reference numeral 51 designates the configuration of a workpiece to be machined; 52, the configuration of the workpiece which has been machined; and 53, a display frame which indicates the range of display in the display screen of the configuration display device. The enlarged view of FIG. 3 corresponds to the single figure of the part 54 in FIG. 2 which is defined by the single-dot chain line. A conventional system for enlarging a part of a workpiece for display will be described with reference to the flow chart of FIG. 4.

First, data indicating the configuration of a workpiece to be machined and data corresponding to the configuration of the workpiece which has been machined are inputted by the input section 21 of the controller 20. The data thus inputted is computed by the arithmetic section 22 to obtain configuration data with which the configuration of the workpiece is displayed on the graphics display device 26 shown in FIG. 2.

Then, a viewing point 55 (FIG. 2), indicating the center of an image to be displayed, and a scale factor for the displayed image picture are established (Step 1 in FIG. 4). More specifically, a portion of the image shown in FIG. 2 is selected for enlargement, and the center of the portion thus selected is determined as the viewing point 55. Then, in order to display the enlarged image of the selected portion, a scale factor is determined for the image. For instance in the case where a straight line 100 mm in length is to be displayed at a scale factor of 10 mm/dot, the straight line is displayed with 10 dots, and with a scale factor of 0.5 mm/dot, it is displayed with 200 dots.

Therefore, the display data is scaled according to the scale factor thus determined and with reference to the viewing point previously set (Step 2 in FIG. 2). More specifically, the display data of the configuration shown in FIG. 2 is computed by the arithmetic section 22 to obtain data in a coordinate system the origin of which is the viewing point 55. Then, the numbers of dots are calculated for the display data according to the scale.

Next, according to the numbers of dots thus calculated, the portions of the figure which are to be eliminated from the display frame 53 are removed, that is, clipping of the display data is carried out (Step 3 in FIG. 4). This will become more apparent from FIG. 5. In FIG. 5, a display frame 53 displaying configuration data has a viewing point 61. However, if the viewing point 61 is shifted to a viewing point 62 with the scale factor unchanged, the frame 53 will be shifted to a frame 63. Accordingly, parts 65 and 66 become clipped areas, which are eliminated.

Thereafter, using the display data thus clipped, an enlarged image of the configuration is displayed on the display screen as shown in FIG. 3 (Step 4 in FIG. 4).

In the above-described conventional display system, the enlarged image of only a part of the figure is displayed. Therefore, in the case where it is required to display the enlarged images of a plurality of parts of the figure, the display data (viewing point and scale factor) must be set up for each of the parts to be displayed. This operation is rather troublesome. Furthermore, it is impossible to individually and simultaneously display the enlarged images of the parts to be observed.

SUMMARY OF THE INVENTION

Accordingly, an object of this invention is to eliminate the above-described difficulties accompanying a conventional display method for a graphics display device of a numerical control apparatus. More specifically, an object of the invention is to provide a display method for a graphics display device in a numerical control apparatus in which enlarged images to be displayed can be readily selected.

Another object of the invention is to provide a display method for a graphics display device of a numerical control apparatus in which a plurality of small images can be displayed on one and the same screen.

A further object of the invention is to provide a display method for a graphics display device of a numerical control apparatus in which images displayed can be easily checked.

The foregoing objects and other objects of the invention have been achieved by the provision of a display method for a graphics display device of a numerical control apparatus which displays graphic data related to a machining apparatus and a workpiece, which, according to the invention, includes steps of: operating an input section of the numerical control apparatus to input data indicative of the machining apparatus, data indicating the initial configuration of the workpiece, and data indicating the final configuration of the workpiece; computing the data thus inputted to obtain configuration data; displaying the configuration data thus obtained on the graphics display device; inputting a selection number for selecting a plurality of regions out of a figure displayed on the graphics display device; inputting viewing points and scale factors for the plurality of regions; subjecting the images of the plurality of regions to scaling and clipping according to the inputted viewing points and scale factors; storing the images thus subjected to scaling and clipping in a memory section; and displaying the images stored in the memory section on the graphics display device.

The nature, principle and utility of the invention will become more apparent from the following detailed description when read in conjunction with the accompanying drawings.

DESCRIPTION OF THE PREFERRED EMBODIMENTS

A preferred embodiment of the invention will now be described.

Figure 1:
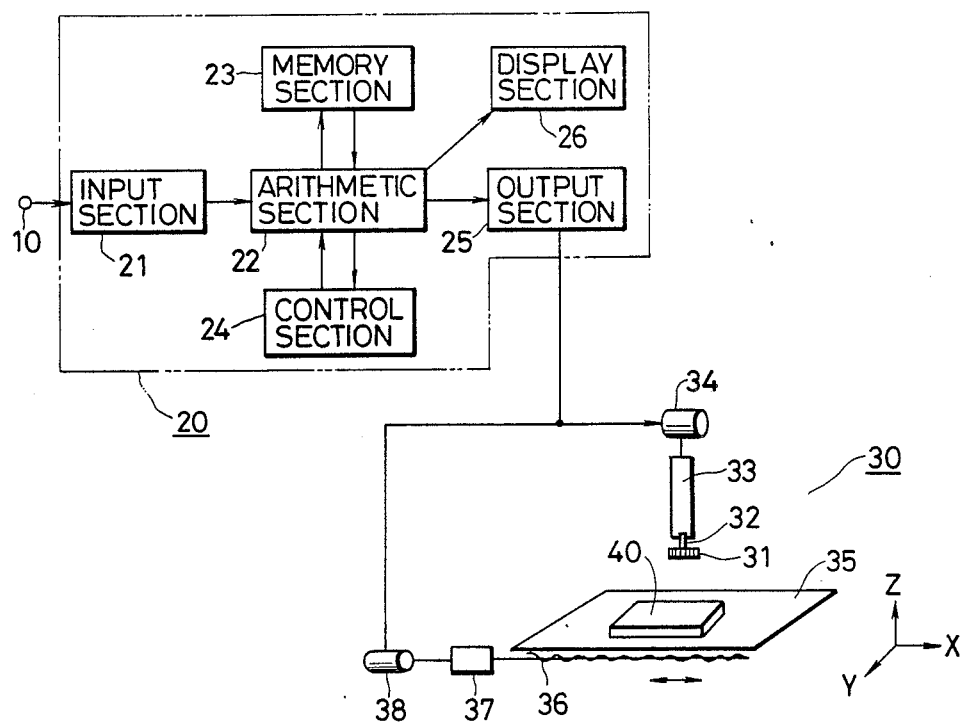
FIG. 1 is an explanatory diagram outlining the arrangement of an NC machining apparatus.
Figure 2:
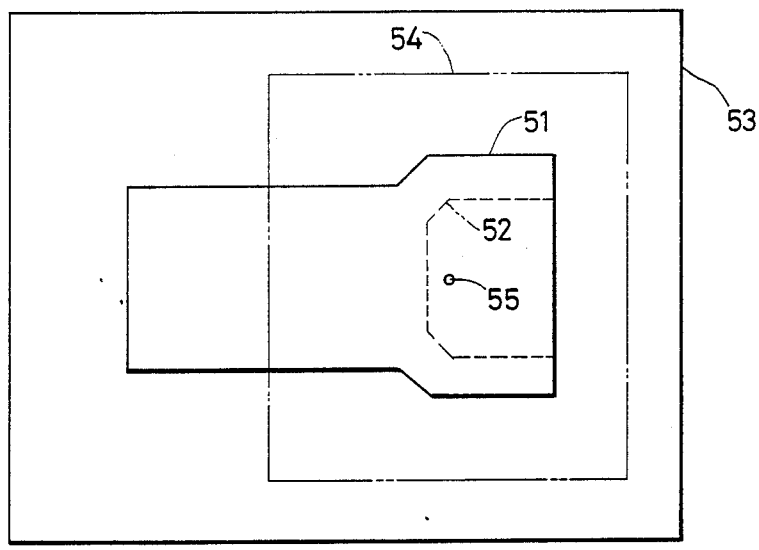
FIG. 2 is an explanatory diagram showing the configuration of a workpiece the image of which is displayed on a graphics display device.
Figure 3:
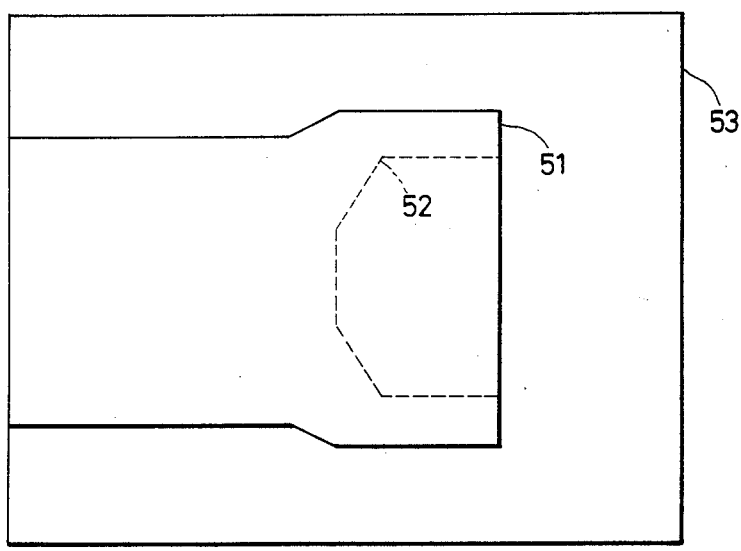
FIG. 3 is an explanatory diagram showing the enlarged image of a part of the workpiece of FIG. 2 formed according to a conventional display system.
Figure 4:
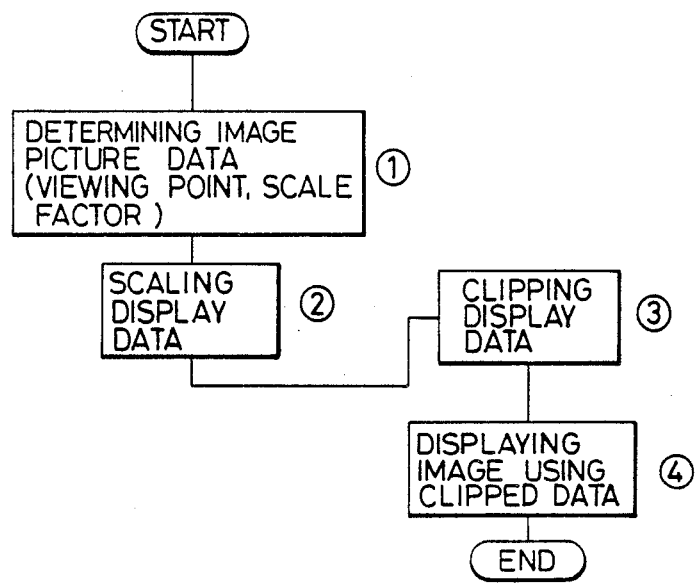
FIG. 4 is a flow chart used for a description of the conventional display system.
Figure 5:
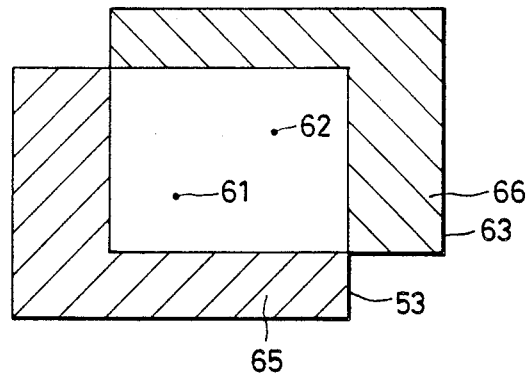
FIG. 5 is an explanatory diagram for a description of a clipping operation.
Figure 6:
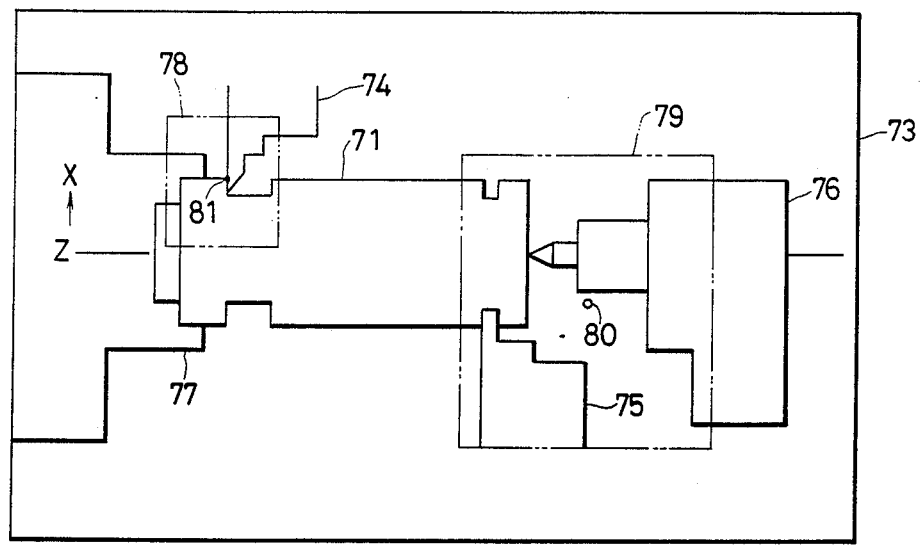
FIG. 6 is an explanatory diagram used for a description of graphics data parameters in a display system for a graphic display device in a numerical control method of the invention.
Figure 7:
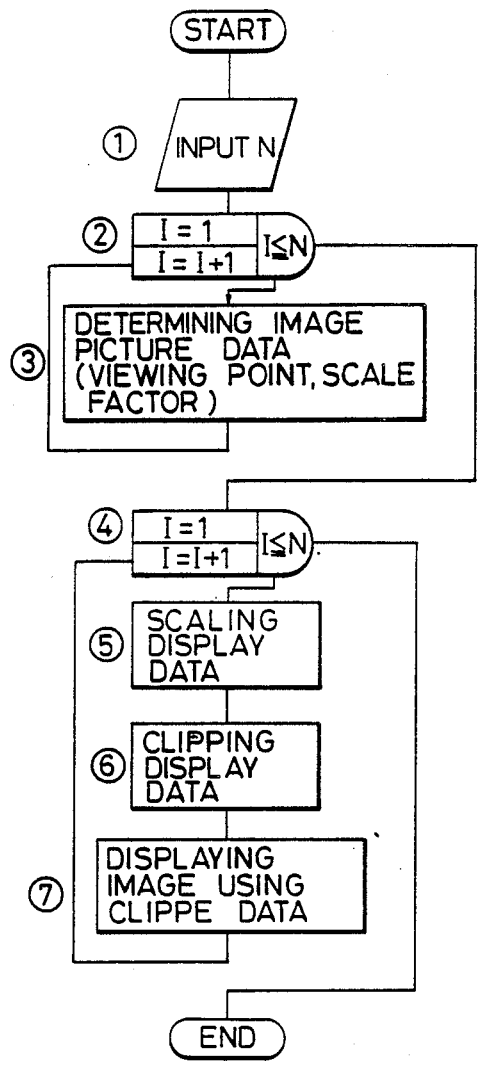
FIG. 7 is a flow chart used for a description of the display system according to the invention.

FIG. 6 shows a figure displayed on a graphics display device. More specifically, FIG. 6 shows a workpiece and a machining apparatus, specifically, a four-axis lathe, having a simplified configuration. FIG. 7 is a flow chart used for a description of the embodiment of FIG. 6.

Similar to the conventional display system, the configurations of the workpiece and the machining apparatus are displayed.

As shown in FIG. 6, the workpiece 71 is cylindrical and is positioned and fixedly held by a chuck 77 which rotates around the axis of rotation. The workpiece 71 is supported at one end by the end of a tail stock 76. A turret 74 machines the workpiece while moving in the direction of the Z axis, while a turret 75 machines the workpiece while moving in the direction of the X axis. The graphics display device can display the workpiece and the machining apparatus as a figure in a display frame 73.

In order to display the enlarged images of the two regions 78 and 79 defined by the dotted lines simultaneously with the screen divided into two parts, picture data, viewing points 80 and 81 and scale factors must be determined for the two regions. As is apparent from FIG. 6, the viewing points 80 and 81 are the centers of the regions 79 and 78, respectively. That is, the viewing points are shifted to the center of a region which is to be observed. The scale factors are expressed by the sizes of the regions 78 and 79. The size of the regions 78 and 79 may be varied in inverse proportion to the scale factors of the respective regions 78 and 79. In general, the scale factors are so selected that the regions which are to be observed occupy the whole area of the display frame 73.

An example of a display method according to the invention will be described with reference to the flow chart of FIG. 7.

First, as in the conventional display system, data related to the workpiece and the machining apparatus is inputted to obtain configuration data with which the configurations of the workpiece and machining apparatus are displayed as shown in FIG. 6.

Then, the number of parts into which the screen defined by the display frame 73 is divided, namely, the number of regions of the configuration of FIG. 6 which are to be displayed, is determined. That is, the number of divisions N is inputted (Step 1 in FIG. 7).

Sets of picture data, each including a viewing point and a scale factor, are provided in correspondence to the number of divisions N (Steps 2 and 3 in FIG. 7). More specifically, as described above, the viewing points 81 and 80 of the regions 78 and 79 are set and inputted and the scale factors are set and inputted.

Figure 8:
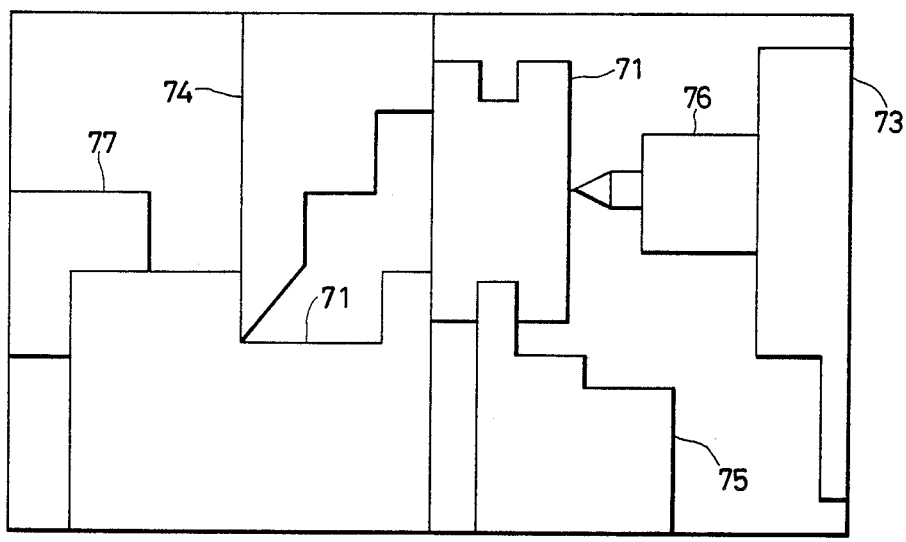
FIG. 8 is an explanatory diagram showing a figure which is displayed on the screen of the graphics display device according to the display system of the invention.

Each region is subjected to scaling (Steps 4 and 5 in FIG. 7) and to clipping (Step 6 in FIG. 7) by the arithmetic section, and the results thereof are stored in the memory section with which the enlarged images of the regions are displayed as shown in FIG. 8 (Step 7 in FIG. 7).

Figure 9:
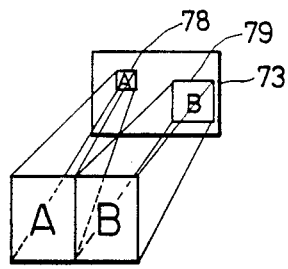
FIG. 9 is an explanatory diagram for a description of a scaling operation.

Scaling is carried out as shown in FIG. 9. The screen is divided according to the number of divisions N, and the data of the regions 78 and 79 are converted so that the images of the regions 78 and 79 which have been enlarged according to the respective scale factors are displayed. In this case, the images of the regions 78 and 79 may partially overlap each other. The regions 78 and 79 are preferably displayed with dotted lines as shown in FIG. 6. Clipping is carried out as in the conventional display system. Thus, enlarged images of the portions which are to be observed are displayed simultaneously.

In the above-described embodiment, the screen is divided so that the images of regions of the figure are displayed simultaneously. However, a method may be employed in which the screen is not divided, that is, the whole screen is used, and the images of regions of the figures are displayed on the screen sequentially. In this case, a desired one of the images of the regions can be selected from the memory device. It is impossible to observe a number of images at the same time; however, the method is advantageous in that the image displayed is large in size and it can be selected by one action.

As is apparent from the above description, according to the invention, images of a plurality of desired regions of a figure are simultaneously displayed at a desired size by a graphics display device in an NC machining apparatus. Therefore, the displayed images can be easily checked.

I claim:

1. A display method for a graphics display device of a numerical control apparatus for displaying graphic data relating to a machining apparatus and a workpiece, comprising:

operating an input section of said numerical control apparatus to input data relating to said machining apparatus, data relating to an initial configuration of said workpiece and data relating to a final configuration of said workpiece;

performing calculations on said data thus inputted to obtain configuration data;

displaying said configuration data on said graphics display device in the form of an image of a figure;

selecting a number N of regions of said figure which are desired to be subsequently displayed on said graphics display device;

inputting said number N as a display division selection number;

dividing the display area of said graphics display device into N portions;

inputting viewing points and scale factors for said selected regions, said viewing points being points geometrically predetermined from boundaries of said regions;

scaling and clipping the images of said regions in accordance with respective ones of said viewing points and scale factors;

storing said images thus scaled and clipped in a memory section; and simultaneously displaying said images stored in said memory section on said graphics display device with one of said images being displayed within each one of said N portions.

2. The display method as claimed in claim 1, wherein enlarged images of said regions are displayed on said graphics display device simultaneously, said regions being separated from each other as viewed in said figure.

3. The display method as claimed in claim 1, wherein said viewing points are centers of respective ones of said regions.

4. The display method as claimed in claim 3, wherein the size of displayed images is varied according to the size of the respective ones of said scale factors.

5. The display method as claimed in claim 4, wherein each said scale factor is indicated by a dotted line on said screen of said graphics display device with the corresponding viewing point as the center.

6. The display method as claimed in claim 5, wherein said scaling step comprises performing arithmetic operations with data relating to said figure displayed on said graphics display device converted into further data having a coordinate system with said viewing point as the origin thereof.

7. The display system as claimed in claim 6, wherein each image obtained through said scaling is subjected to said clipping to eliminate parts of said image from said display screen.

8. The display system as claimed in claim 1, wherein said graphics display device is a monitor television set.

9. A display method for a graphics display device of a numerical control apparatus for displaying graphic data relating to a machining apparatus and a workpiece, comprising:

operating an input section of said numerical control apparatus to input data relating to said machining apparatus, data relating to an initial configuration of said workpiece and data relating to a final configuration of said workpiece;

performing calculations on said data thus inputted to obtain configuration data;

displaying said configuration data as an image of a figure on said graphics display device;

inputting a selection number corresponding to the number of regions of said figure which are to be displayed on said graphics display device;

inputting viewing points and scale factors for said regions, said viewing points being points geometrically predetermined from boundaries of said regions, said regions being distinct from each other as viewed in said figure;

scaling and clipping the images of said regions in accordance with respective ones of said viewing points and scale factors;

storing said images thus scaled and clipped in a memory section; and displaying said images stored in said memory section on said graphics display device in one of a simultaneous and sequential manner.

10. A display method for a graphics display device of a numerical control apparatus for displaying graphic data relating to a machining apparatus and a workpiece, comprising:

operating an input section of said numerical control apparatus to input data relating to said machining apparatus, data relating to an initial configuration of said workpiece and data relating to a final configuration of said workpiece;

performing calculations on said data thus inputted to obtain configuration data;

displaying said configuration data as a figure on said graphics display device;

inputting, as a selection number N, a number, greater than 1, of regions of said figure displayed on said graphics display device, said number N representing the number of regions of said figure to be subsequently separately displayed;

inputting viewing points and scale factors for said selected regions, said viewing points being points geometrically predetermined from boundaries of said regions;

scaling and clipping the images of said regions in accordance with respective ones of said viewing points and scale factors;

storing said images thus scaled and clipped in a memory section; and controlling said graphics display device so as to sequentially display the images stored in said memory section.

* * * * *